United States Patent [19]

Beck

[11] Patent Number: 4,658,516

[45] Date of Patent: Apr. 21, 1987

[54] TAP SOLE CONSTRUCTION

[75] Inventor: Guy Beck, Bradford, Mass.

[73] Assignee: The Timberland Company, Hampton, N.H.

[21] Appl. No.: 841,243

[22] Filed: Mar. 19, 1986

[51] Int. Cl.[4] ............................................. A43C 15/02
[52] U.S. Cl. ................... 36/59 B; 36/30 R; 36/31; 12/142 RS
[58] Field of Search ............... 36/59 A, 59 B, 30 R, 36/30 A, 31, 14; 12/142 RS, 142 T

[56] References Cited

U.S. PATENT DOCUMENTS

| 1,470,442 | 10/1923 | Grojean | 36/59 B |
|---|---|---|---|
| 1,687,441 | 10/1928 | Grojean | 36/59 B |
| 1,767,748 | 6/1930 | Faleck | 12/142 T |
| 2,273,976 | 2/1942 | Mitchell | 12/142 T |
| 2,640,283 | 6/1953 | McCord | 36/59 B |
| 2,844,833 | 7/1958 | Odermatt | 36/59 A |
| 3,345,664 | 10/1967 | Ludwig | 12/142 RS |
| 3,672,077 | 6/1972 | Coles | 36/59 B |
| 3,863,366 | 2/1975 | Auberry et al. | 36/14 |
| 3,952,429 | 4/1976 | Thomas | 36/31 |
| 4,120,104 | 10/1978 | Lasmo | 36/14 |
| 4,160,331 | 7/1979 | Bell | 36/59 B |
| 4,170,802 | 10/1979 | Roy | 13/142 RS |
| 4,364,188 | 12/1982 | Turner et al. | 136/31 |
| 4,400,894 | 8/1983 | Ehrlich | 36/31 |
| 4,562,606 | 1/1986 | Folschweiler | 136/33 |

FOREIGN PATENT DOCUMENTS

| 1338590 | 9/1962 | France | 36/14 |
|---|---|---|---|
| 811654 | 3/1959 | United Kingdom | 36/14 |

Primary Examiner—Werner H. Schroeder
Assistant Examiner—Mary A. Ellis
Attorney, Agent, or Firm—Wolf, Greenfield & Sacks, P.C.

[57] ABSTRACT

The shoe of the invention consists of a thermally-moldable material which is secured in a cut-out region of the shoe sole.

8 Claims, 8 Drawing Figures

TAP SOLE CONSTRUCTION

FIELD OF THE INVENTION

This invention relates to shoe soles, and particularly to a novel shoe sole construction comprised of a leather-blank or blocker having an insert of thermoplastic material secured in a cut-out area in the forward portion of the leather blank to provide improved traction and wear.

BACKGROUND OF THE INVENTION

Various attempts have been made to provide a shoe sole construction that combines the look of leather with the durability and traction of rubber or other synthetic material. For example, in one such construction, a thermally moldable material is injected onto the entire top surface (i.e., shoe-side) of the leather sole, with a portion of the material extending into and through a cut-out region in the sole. However, this construction presents several disadvantages. First, the thermal material is visible at the sole edges between the midsole and the leather sole itself. Second, if the thermoplastic material is not evenly distributed, the heel of the shoe will not sit properly. Third, the construction is simply too heavy and too rigid, and delamination too often occurs at the shoe edges. Another construction utilizes a synthetic portion attached only on the street-side of the sole, but sole failure or separation has been a recurring problem in such a construction. Still another construction includes a thermoplastic insert molded into a cut-out region in the sole, but this construction has been unsatisfactory because the thermoplastic material has tended to shrink and to pull away from the edge of the cut-out region on the street-side of the sole, resulting in sole failure or separation.

It is therefore an object of the present invention to provide a sole construction comprised of leather and synthetic material in which the sole is lightweight and relatively flexible.

It is another object of this invention to provide such a sole construction having an aesthetically pleasing appearance with no thermal material visible at the edge of the sole.

It is a still further object of this invention to provide a sole construction in which the synthetic material is firmly secured to the leather so as to prevent its separation from the leather, particularly at the edge of the thermal insert, and in which the material does not shrink away from the sole.

SUMMARY OF THE INVENTION

The foregoing objects are achieved and the foregoing problems solved by one illustrative embodiment of the present invention in which a thermally-moldable material is secured in a cut-out region of a leather blank, the edge of the cut-out region being bevelled and the thermally-moldable material being shaped so as to cooperate with said bevelled edge to provide a mechanical "lock" between the leather and the material.

DETAILED DESCRIPTION OF THE PREFERRED EMBODIMENT

Figure 1:
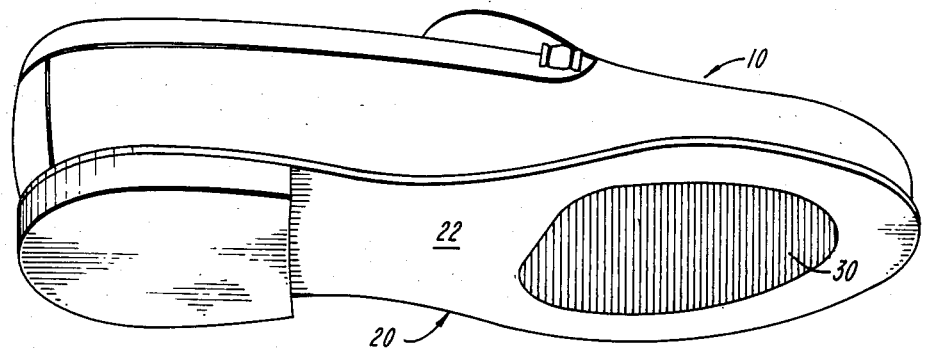
FIG. 1 is a perspective view of a typical shoe that includes the novel sole construction of the instant invention.

FIG. 1 depicts a standard loafer 10 that includes the novel sole construction of the instant invention. Sole 20 is seen to include leather portion 22 and insert 30 of thermoplastic material. The specific construction of sole 20 will be described in conjunction with the remaining drawings.

Figure 2:
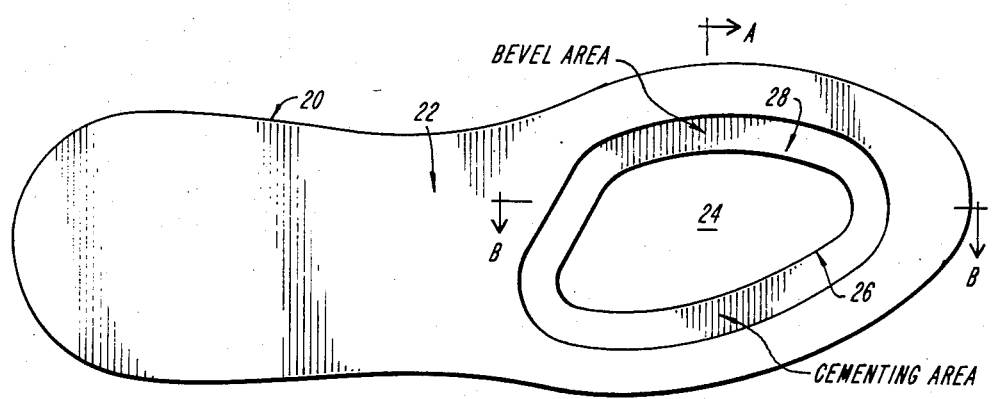
FIG. 2 is a plan view of a leather sole blank (shoe side) having a cut-out area in which a thermoplastic insert will be injected in accordance with the instant invention.

Turning to FIG. 2, there is depicted a blank of leather 22 from which a portion has been removed, leaving cut-out area 24, defined by circumferential edge 26. As seen in FIGS. 2 through 6, edge 26 is bevelled on the shoe side of blank 22 around the perimeter of cut-out area 24. The cut-out area 24 and insert 30 extend over a major portion of the forward region of the sole 20 so that the insert 30 has lateral dimensions in the plane of sole 30 much greater than the thickness of insert 30. In particular, edge 26 is bevelled at 28 at an angle of at most 4 degrees from the plane of sole 20, the taper extending about one-half inch toward the outer edge of the sole. This bevel 28 is introduced by means of a reducing matrix, the amount of material to be removed depending on the thickness of the particular leather blank to be placed in the mold. Bevel 28 assists in providing proper flow of the thermoplastic material in order to form tapered edge 34.

After edge 26 is bevelled, urethane cement (for example, Upaco #3249) is applied on the bevelled (reduced) area 28 around the perimeter of cut-out area 24 on the shoe side of blank 22. When the cement has dried, blank 22 is placed in an injection mold, and the thermoplastic material is injected into the cut-out area as more fully described below.

Figure 3:
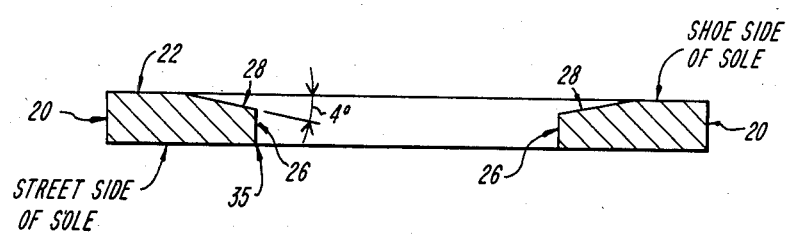
FIG. 3 is an enlarged cross-sectional view of the blank of FIG. 2, as seen along the line A—A, showing the edges of the cut-out area.
Figure 4:
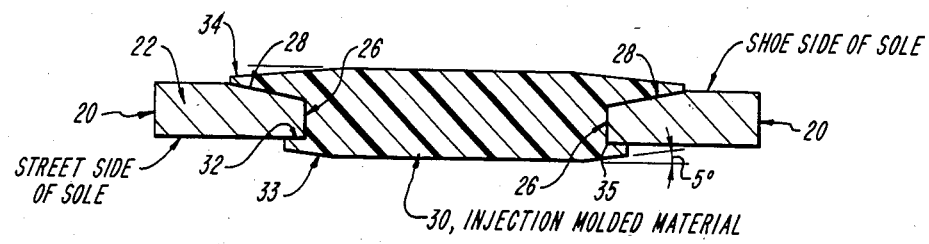
FIG. 4 is an enlarged cross-sectional view of the sole construction of the instant invention, after the thermoplastic insert has been injection molded into blank 22.
Figure 5:
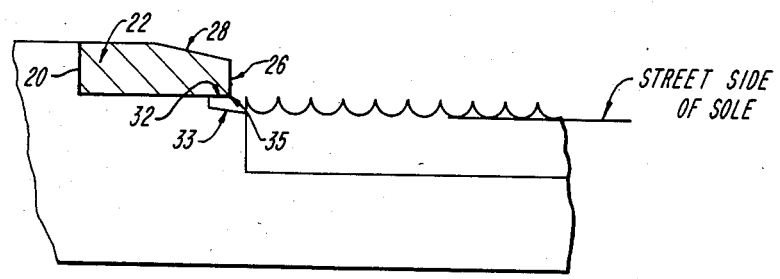
FIG. 5 is a cross-sectional view, along the line B—B of FIG. 2, of the portion of the mold that forms a lip in the thermoplastic insert on the street side of the blank.
Figure 6:
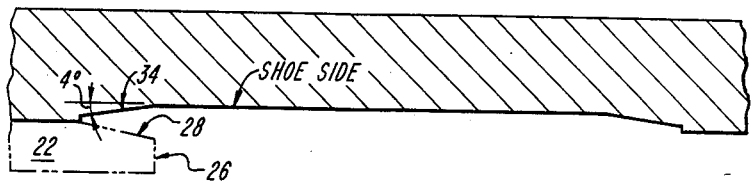
FIG. 6 is a cross-sectional view of the portion of the mold that forms a tapered edge in the insert on the shoe side of the blank.

FIG. 4 is an enlarged cross-sectional view of the sole construction of this invention in the area where insert 30 meets blank 22. Insert 30 preferably includes a lip 32 extending outwardly on the street side of blank 22, and a tapered edge 34 on the shoe side of blank 22, both lip 32 and tapered edge 34 extending around the entire periphery of the cut-out area 24. Lip 32 extends approximately 0.040 inches from the edge of cut-out area 24 toward the outer edge of blank 22, and is approximately 0.030 inch in height at its highest point. To ensure proper and complete molding of lip 32, the outer corner of lip 32 is tapered at 33 at an angle of approximately 5°. In FIG. 5 is depicted the portion of the mold that forms lip 32. Tapered edge 34 on the shoe side of blank 22 is formed so as to mate with bevelled area 28 (FIG. 3). As seen in FIG. 6, which depicts the portion of the mold that forms tapered edge 34, a 4° taper is provided by the mold, which, combined with the bevelled (reduced) area 28 of the leather blank, produces a tapered edge 34 of no more than 8°, depending on the amount of material removed from blank 22 at area 28 during the reducing step described above.

Lip 32 and tapered edge 34 cooperate with edge 26 to secure the injected insert 30 in place in cut-out area 24. Insert 30 is effectively prevented from detachment from blank 22 in the direction toward the street side of the sole by means of tapered edge 34, which is sandwiched between blank 22 and the midsole of the shoe. It is prevented from detachment or movement in a direction toward the shoe side of sole 20 by means of lip 32, which effectively provides a mechanical lock between the insert and edge 26 of blank 22. It should be noted that, during the molding process, corner 35 of edge 26 (see FIG. 4) may become somewhat compressed or rounded off due to the pressure of the molded material, but this circumstance has been found not to affect the utility or performance of the subject invention.

As previously indicated, tapered edge 34 preferably extends outwardly about one-half inch from edge 26 of cut-out area 24. Lip 32 extends outwardly about 0.0040 inch beyond edge 26 at the street side of sole 20. In a typical construction such as here depicted, leather blank 22 is approximately one iron (one-eighth inch) thick. Insert 30 is about 0.150 inch thick at its thickest point.

Because of the bevelled area 28 of blank 22 and the mating tapered edge 34 of insert 30, insert 30 presents a very low profile on the shoe side of sole 20. Consequently, sole 22 can mate with the midsole of the shoe without producing a bulge, since the bulk of the moldable material forming insert 30 occupies cut-out area 24. Moreover, the thermoplastic material will not be visible at the edge of the shoe, and delamination at the edge of the shoe will be minimized because this invention permits a leather-to-leather bond at the shoe edge.

Figure 7:
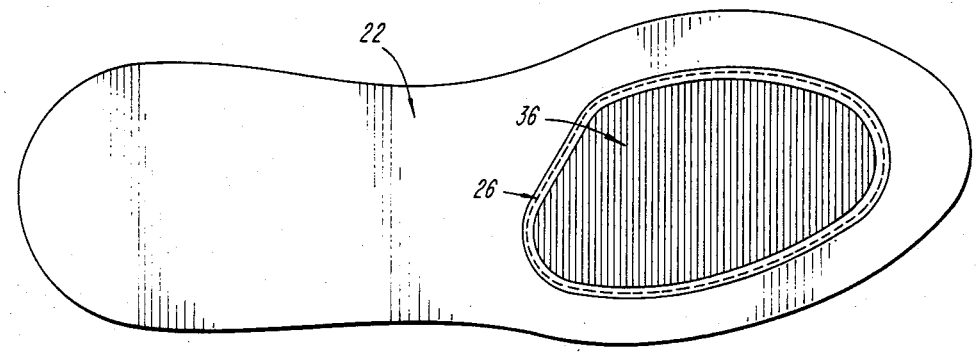
FIG. 7 is a plan view of the street-side of the sole construction of the preferred embodiment of the present invention.
Figure 8:
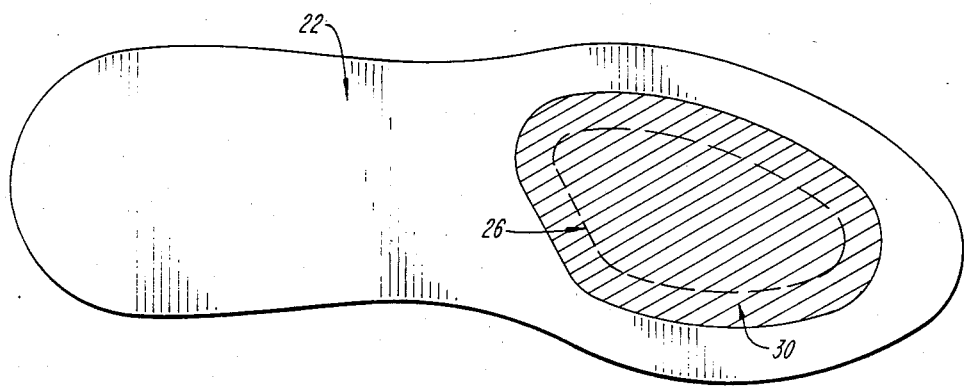
FIG. 8 is a plan view of the upper (shoe) side of the sole of FIG. 7.

FIGS. 7 and 8, respectively, depict the shoe-side and the street-side of the sole construction of the instant invention. In the preferred embodiment here depicted, the thermal insert 30 includes conventional tread 36 to provide improved traction.

In the structure here described, a special blend of polyvinyl chloride-urethane available from Gary Chemicals of Leominster, Mass., no. GTX85-091, was found to be best suited for insert 30. This compound will flow easily at 280° F. to 305° F., so that the leather blank will not be burned during the molding process. Use of a low pressure, slow injection molding machine such as United Shoe Machinery model F was found to produce satisfactory results.

It will be readily appreciated by those skilled in the art that the present invention in its broader aspects is not limited to the specific embodiments herein shown and described. Accordingly, variations may be made from the embodiments described herein which are within the scope of the accompanying claims, without departing from the principles of the invention and without sacrificing its chief advantages.

What we claim is:

1. A shoe sole comprising a blank having an insert of thermally-moldable material secured in and filling a cut-out area int he forward portion of the blank, said insert extending over a major part of the forward portion of the sole area and having lateral dimensions much greater than the thickness thereof, the edge of said cut-out area being bevelled on the shoe-side of the blank toward the outer edge of the blank at a small angle relative to the shoe-side surface of the blank, and the insert having a lip around its perimeter on the street-side of the blank and a tapered edge around its perimeter on the shoe-side of the blank, said tapered edge lying upon the bevelled portion of the edge of the cut-out area, said edge of said cut-out area cooperating with said tapered edge and said lip to secure said insert to said blank.

2. The sole of claim 1 wheein said insert is injection-molded into said cut-out area.

3. The sole of claim 1, wherein said tapered edge is joined to said bevelled area by means of adhesive.

4. The sole of claim 1, wherein said thermally-moldable material comprises polyurethane.

5. The sole of claim 1, wherein the outer edge of said lip is bevelled.

6. A method for manufacturing a shoe sole comprising:
    cutting out an area of a sole blank in the forward region thereof, said cut-out area extending over a major part of the forward region of the sole;
    bevelling the edge defining said cut-out area on the shoe side of said sole, and applying an adhesive to the bevelled edge; and
    injection molding a thermoplastic material into said cut out area in such a way as to form an insert having a lip around its perimeter on the street side of the sole, and a tapered edge around its perimeter on the shoe side of the sole, the tapered edge lying upon the bevelled portion of the edge of the cut-out area, said insert having lateral dimensions much greater than the thickness thereof.

7. The sole of claim 1 wherein said lip and said tapered edge define a groove around the perimeter of said insert which secures said insert in said cut-out area without stitching, said tapered edge preventing an uncomfortable bulge at the intersection of the blank and the insert.

8. The sole of claim 1 wherein said tapered edge is tapered at less than 8° and said bevelled portion of the cut-out area is bevelled at less than 4° so that said insert is secured in said cut-out area without causing a bulge in said sole.

* * * * *

UNITED STATES PATENT AND TRADEMARK OFFICE
CERTIFICATE OF CORRECTION

PATENT NO. : 4,658,516

DATED : April 21, 1987

INVENTOR(S) : Guy Beck

It is certified that error appears in the above-identified patent and that said Letters Patent is hereby corrected as shown below:

Column 3, line 25, cancel "0.0040" and insert --0.040--.

Column 4, line 8, cancel "int he" and insert --in the--.

Column 4, line 22, cancel "wheein" and insert --wherein--.

Column 4, line 39, cancel "cut out" and insert --cut-out--.

Signed and Sealed this

Eleventh Day of August, 1987

Attest:

DONALD J. QUIGG

Attesting Officer

Commissioner of Patents and Trademarks